(12) United States Patent
Wang et al.

(10) Patent No.: US 7,450,167 B2
(45) Date of Patent: Nov. 11, 2008

(54) METHOD FOR IMPROVING IMAGE QUALITY

(75) Inventors: Yu-wei Wang, Fort Collins, CO (US);
Zhehong Chen, Fort Collins, CO (US);
John M. Baron, Longmont, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 727 days.

(21) Appl. No.: 11/055,955

(22) Filed: Feb. 11, 2005

(65) Prior Publication Data

US 2006/0181621 A1    Aug. 17, 2006

(51) Int. Cl.
*H04N 9/64*    (2006.01)

(52) U.S. Cl. ................................................ 348/246
(58) Field of Classification Search ............... 348/241, 348/246, 247
See application file for complete search history.

(56) References Cited

U.S. PATENT DOCUMENTS 7,102,673 B2 *   9/2006   Kimura ..................... 348/246
7,202,894 B2 *   4/2007   Kaplinsky et al. ........... 348/246

* cited by examiner

*Primary Examiner*—Lin Ye
*Assistant Examiner*—Trung Diep (57) ABSTRACT

Methods for improving image quality of a digital image are disclosed herein.

32 Claims, 7 Drawing Sheets

METHOD FOR IMPROVING IMAGE QUALITY

BACKGROUND

Digital imaging devices, such as digital cameras, use a two-dimensional array of photosensors to generate image data representative of a scene. Many of the two-dimensional photosensor arrays contain several million photosensors. During the manufacturing process and during the life of the two-dimensional photosensor arrays, many of the photosensors become defective. The quality of image data generated by a two-dimensional photosensor array declines as the number of defective photosensors increases. Eventually, the number of defective photosensors will cause an image replicated by the image data to be unacceptable.

DETAILED DESCRIPTION

Figure 1:
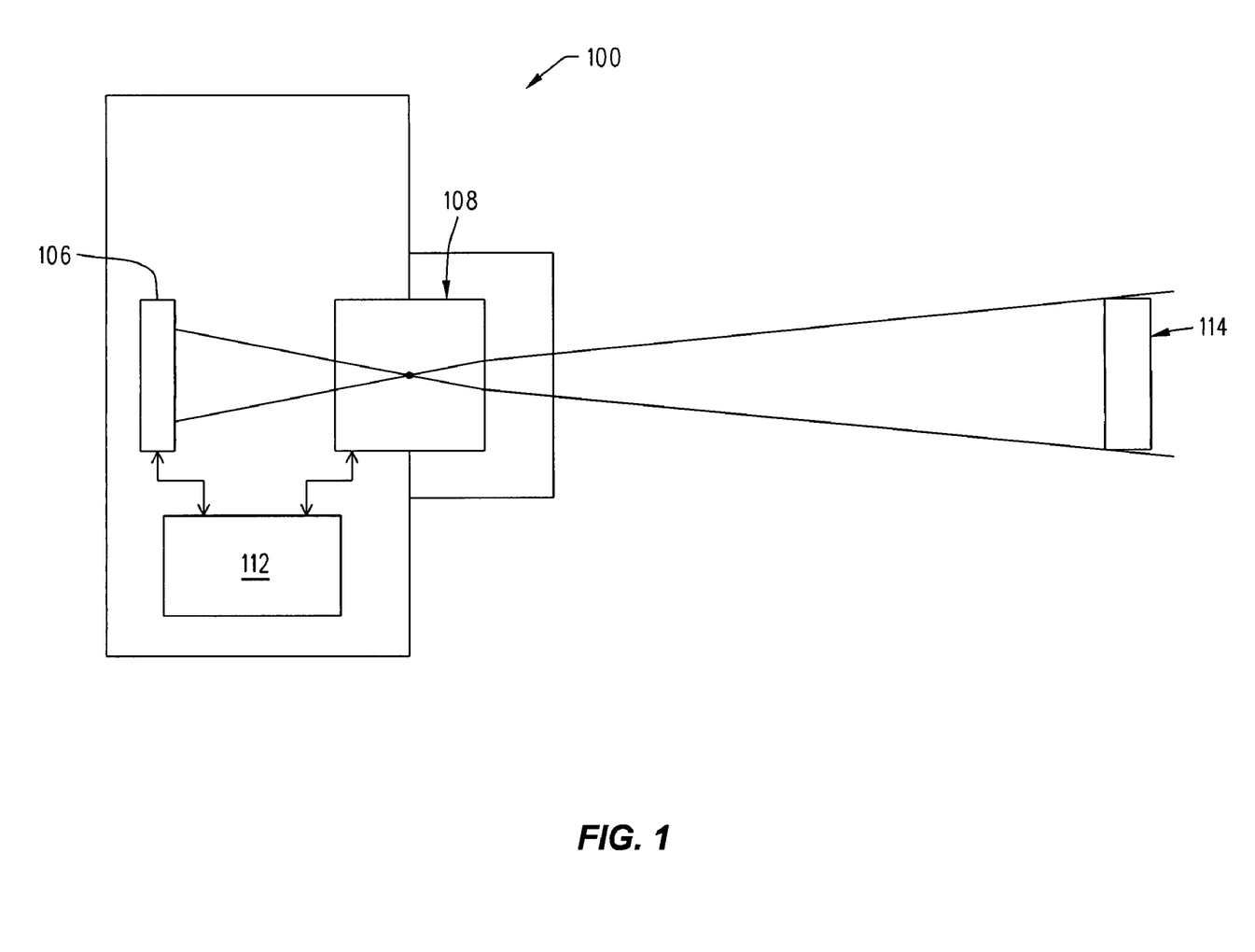
FIG. 1 is a side cutaway view of an embodiment of a digital camera.

Devices and methods for analyzing image data and for overcoming the effects of defective photosensors are described herein. Referring to FIG. 1, in one embodiment, a digital camera 100 includes a two-dimensional photosensor array 106 and a lens/shutter device 108. It is noted that the lens and shutter are described herein as being a single lens/shutter device 108. This description is solely for simplifying the operation of the digital camera 100 and that in many embodiments the lens and shutter may be separate devices. It is further noted that the digital camera 100 of FIG. 1 is a side cutaway view of a simplified digital camera and that other digital cameras may contain more components than the digital camera 100 described in FIG. 1.

A processor 112 may be located in the digital camera 100. The processor may store and execute computer code that controls the digital camera 100 and may process image data generated by the photosensor array 106. In addition, the processor 112 serves to control the lens/shutter device 108 and the photosensor array 106. For example, the processor 112 may cause the lenses to change focal length and may cause the shutter to open and close at specific times. Likewise, the processor 112 may also cause the photosensor array 106 to generate image data at specific times and to receive the image data generated by the photosensor array 106. The processor 112 may analyze and process the image data, wherein the processing includes the methods described herein.

In summary, the digital camera 100 generates image data representative of an image of an object 114. The image of the object 114 is focused by the lens/shutter device 108 onto the photosensor array 106. During image capture, the shutter may open for a preselected exposure time during which the photosensor array 106 generates image data representative of the image of the object 114. The image data is processed by the processor 112. As described in greater detail below, the processor 112 reduces the effects of image data generated by defective photosensors located on the photosensor array 106.

Figure 2:
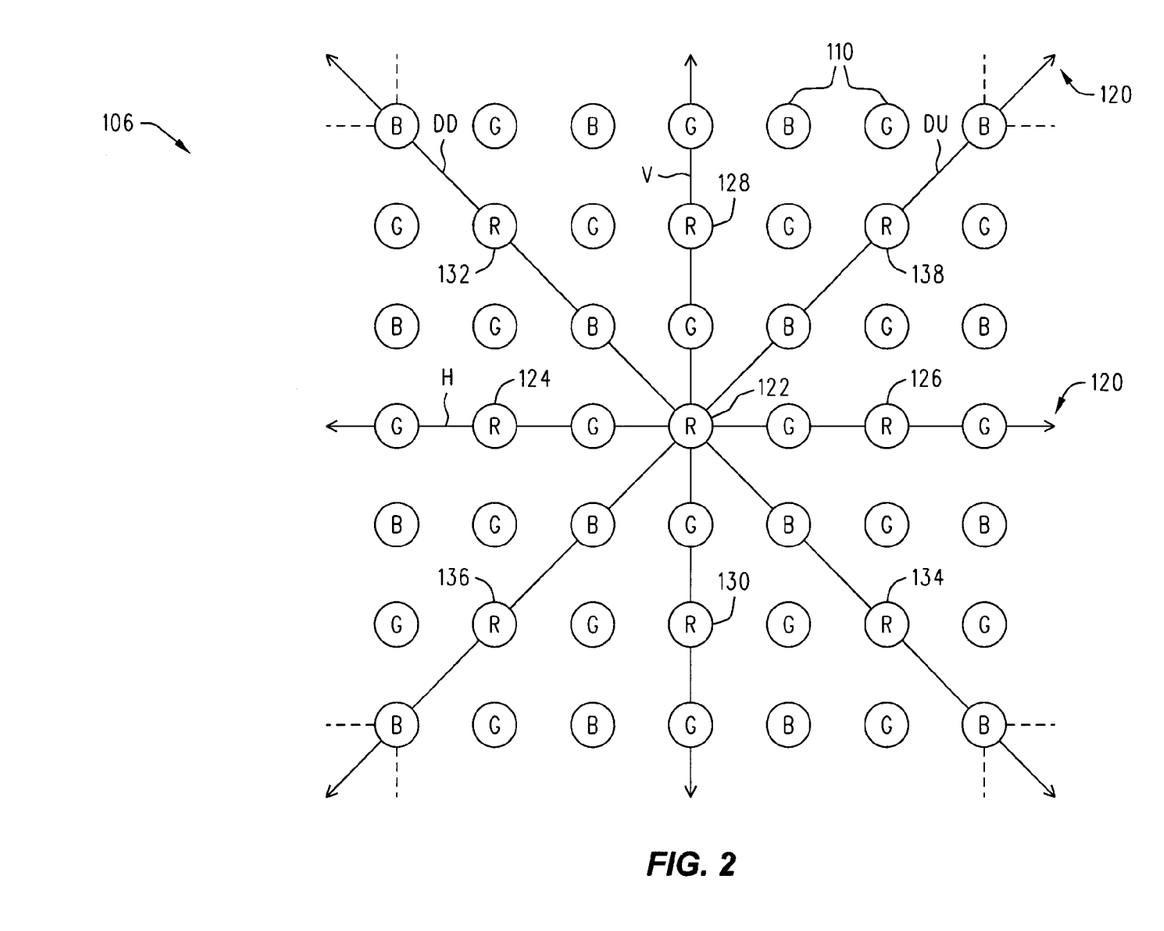
FIG. 2 is a partial front view of an embodiment of a two-dimensional photosensor array used in the digital camera of FIG. 1.

Having summarily described the digital camera 100 and its operation, the digital camera 100 and its operation will now be described in greater detail. A greatly enlarged and partial front view of an embodiment of the photosensor array 106 is shown in FIG. 2. The photosensor array 106 consists of a plurality of photosensors 110 arranged in a Bayer pattern. The designation on each of the photosensors 110 indicates the color of light that the particular photosensor images or otherwise converts to electric signals or data. Some photosensors operate by receiving a specific color or wavelength of light. During the period that they receive this light, the photosensors build up a charge. When imaging is complete, the charges are converted to electric signals and ultimately to a pixel values. Thus, the intensity of light received by the photosensor causes a preselected accumulation of charge based on the intensity of incident light. As described in greater detail below, when light is incident on defective photosensors, the amount of charge accumulated over a period of time, based on the intensity of incident light, does not accumulate at the same or at a similar rate as functioning photosensors.

It is noted that imaging or capturing a scene comprises generating image data representative of the scene. Thus, photosensors designated by the letter G image or generate image data representative of the amount or intensity of green light focused onto them. Likewise, photosensors designated by the letter R image red light and photosensors designated by the letter B image blue light.

With additional reference to FIG. 1, an image of the object 114 is focused onto the photosensor array 106. The photosensors 110 generate image data corresponding to the intensity of light they receive, which corresponds to the intensity of light in the image focused onto the photosensor array 106. Thus, a blue photosensor that receives a high intensity of blue light will output image data corresponding to the high intensity of blue light received. Image data as used in reference to the photosensor array 106 may be either digital or analog data.

The image data generated by the photosensor array will not accurately represent the image of the object 114 if a photosensor is defective. As the number of defective photosensors increases, the quality of an image represented by the image data degrades. For example, a defective photosensor may indicate that the intensity of received light is much higher or lower than it really is. The result is a bright or dark spot on the replicated image. As the number of these spots increase, the quality of the image decreases.

In order to detect or identify defective photosensors, the processor 112 causes the shutter in the lens/shutter device 108 to remain closed while causing the photosensor array 106 generates image data of a dark scene caused by the closed shutter. The image of the dark scene is sometimes referred to as a dark frame. Ideally, all the photosensors 110 should generate image data representative of a dark scene. It is noted that the temperature of the photosensor array 106 may cause the photosensors 110 to generate image data indicating a slightly illuminated scene, i.e., not completely dark. As described in greater detail below, defective photosensors will generate image data representative of light intensity that is greater than a preselected threshold. As described in greater detail below, the preselected threshold may be a preselected amount greater than the average of the image data representative of the dark frame.

The data generated by the photosensors is transmitted to the processor 112. An analog to digital converter may convert the data to digital data. The digital data is referred to herein as image data and comprises a plurality of pixel values. The pixel values represent the intensity of light each photosensor images. Pixel values of photosensors that receive little light are zero or close to zero and pixel values of photosensors that receive intense light are high. In one embodiment, the pixel values range from zero to 4095. Thus, under ideal circumstances, the image data or pixel values of all photosensors in the dark frame is all zeros. However, heat will cause the photosensors to generate some data, so the pixel values are likely greater than zero even if all the photosensors are operating properly. In one embodiment, a bias, such as thirty, is added to the image data so that variations in the image data are more readily processed.

As set forth above defective photosensors may generate high values during the dark frame. Therefore, the processor 112 determines that photosensors associated with pixel values that are greater than a preselected value are defective. In one embodiment, the processor 112 may calculate the average of the pixel values. The processor 112 may then determine that pixel values greater than a preselected value over the average are defective. In one embodiment, the preselected value is the average or mean pixel value plus five times the standard deviation. Accordingly, the processor 112 identifies photosensors that are associated with pixel values that are greater than an average pixel value plus five times the standard deviation to be defective. Pixel values for the defective photosensors are calculated as described below.

In some embodiments, the processor 112 establishes the preselected value by applying the above-described analysis to fewer than all the pixel values in the dark frame. The pixel values that are analyzed may correspond to a portion of the photosensor array 106 that is not proximate a heat source. Thus, the analyzed pixel values will likely not be skewed by the temperature of the photosensor array 106. In some embodiments, pixel values associated with a portion of the center of the photosensor array 112 are analyzed. This center portion may be approximately thirty-two photosensors by thirty-two photosensors.

In another embodiment, defective photosensors may be detected as photosensors that accumulate less than a preselected charge. For example, photosensors that accumulate less charge over time may be identified as defective. In one embodiment, a threshold of for pixel values of the average minus five times the standard deviation may be used as the threshold. It is noted that other values may be selected for the thresholds.

When defective photosensors are identified, the processor 112 substitutes image data for the pixel values of the defective photosensors. In other words, the location on the image corresponding to the defective photosensor will not be accurately imaged, so the processor 112 substitutes the image data for that location. Thus, the adverse effects of the defective photosensors are reduced.

In summary, the processor 112 establishes axes 120 that extend through the defective photosensor and through photosensors of the same color as the defective photosensor. The absolute value of the difference in pixel values along a first axis are calculated wherein the corresponding photosensors are located on opposite sides of the defective photosensor. The absolute value of the difference in pixel values along a second axis are also calculated wherein the corresponding photosensors are located on opposite sides of the defective photosensor. The pixel values that have the smallest absolute value of their difference are selected to calculate a value for the defective photosensor. In one embodiment, the pixel value corresponding to the defective photosensor is the average of the selected pixel values.

It is noted that the differences are calculated to reduce the probability that the pixel values of the defective photosensors were selected based on high contrast transitions. A high absolute value of the difference in pixel values means that the defective photosensor may be located on a line or high contrast transition that is substantially perpendicular to the axis. Basing the pixel value of the corresponding defective photosensor on such a difference may cause the line or high contrast transition in the replicated image to be blurred. A lower absolute value of the difference typically means that a line or high contrast transition does not extend perpendicular to the axis. Accordingly, these pixel values are used to select the pixel value of the defective photosensor.

An example of determining a pixel value for a defective red photosensor 122 is shown in FIG. 2. In the Bayer pattern, the same analysis may apply to determining a pixel value for a defective blue photosensor. The processor 112 or the like may establish a plurality of axes 120 that extend through the defective photosensor 122. In the embodiment of FIG. 2, four axes 120 are established and are referred to as the V axis, the H axis, the DD axis, and the DU axis. In the embodiment of FIG. 2, the V axis is substantially perpendicular to the H axis and the DD axis is substantially perpendicular to the DU axis. It is noted that these axes do not necessarily have to be perpendicular or at angles of forty-five degrees relative to one another.

In the embodiments described herein, pixel values corresponding to photosensors located adjacent the defective photosensor 122 are analyzed. Pixel values corresponding to photosensors other than those adjacent the defective photosensors may be analyzed. In the embodiment described herein where the defective photosensor 122 is a red photosensor, the pixel values corresponding to the red photosensors located adjacent the defective photosensor 122 are analyzed. With regard to the H axis, pixel values corresponding to a photosensor 124 and a photosensor 126 are analyzed. These photosensors 124, 126 are located on the H axis and are on opposite sides of the defective photosensor 122. The absolute value of the difference between the pixel values corresponding to the photosensors 124 and 126 is calculated. This difference is referred to herein as the H axis difference. The difference between pixel values corresponding to photosensors located on the V axis is also calculated. More specifically, the absolute value between pixel values corresponding to a photosensor 128 and a photosensor 130 is calculated. This difference is referred to herein as the V axis difference. These photosensor 128 are located on the V axis and are also located on opposite sides of the defective photosensor 122.

Selection of a pixel value corresponding to the defective photosensor 122 may be accomplished using pixel values of one of the differences. In the analysis provided to this point, two differences, the H axis difference and the V axis difference, have been calculated. The pixel values of the lesser of either the H axis difference or the V axis difference are selected to be used to calculate the pixel value corresponding to defective photosensor 122. If the H axis difference is less than the V axis difference, then the pixel values corresponding to photosensor 124 and photosensor 126 are used for calculating the pixel value for the defective photosensor 122. In one embodiment, the average of the pixel values corresponding to the photosensors 124 and 126 is calculated and used for the pixel value of the defective photosensor 122. Processing of the image data proceeds using this pixel value.

Another embodiment will now be described using all of the axes 120 shown in FIG. 2. The difference between pixel values corresponding to a photosensor 132 and a photosensor 134 is calculated. The absolute value of the difference is referred to herein as the DD axis difference. Likewise, the difference between pixel values corresponding to a photosensor 136 and a photosensor 138 is calculated. The absolute value of this difference is referred to herein as the DU axis difference. In this embodiment, all the differences are analyzed or compared to determine which difference is the minimum. The pixel values of the minimum difference are then used to calculate the pixel value of the defective photosensor 122.

As noted above, the axis corresponding to the minimum absolute value of the difference in pixel values is likely not intersected by a high contrast transition in the vicinity of the defective photosensor 122. If an axis was intersected by a high contrast transition, the difference in pixel values along the axis and on either side of the transition would be relatively high. Calculating a pixel value based on an axis that is perpendicular to the transition may subject the transition to blurring or other anomalies. Therefore, the pixel values corresponding to the minium difference are used to calculate a pixel value for the defective photosensor 122.

It is noted that some of the photosensors used in the analysis are closer to the defective photosensor 122 than other photosensors. For example, photosensors 124, 126, 128, and 130 are closer to the defective photosensor 122 than photosensors 132, 134, 136, and 138. For that reason, some of the above-described differences may have a weight applied. The minimum difference is then selected based on the weighted differences. For example, the DU axis difference and the DD-axis difference may be multiplied by a preselected constant. In one embodiment, the preselected constant is twice the cosine of forty-five degrees, which is approximately 1.414. Accordingly, the DU axis difference and the DD axis difference are multiplied by 1.414 prior to selection of the minium difference.

Having described an embodiment for calculating a pixel value for a defective red or blue photosensor, calculating a pixel value for a defective green photosensor will now be described.

Figure 3:
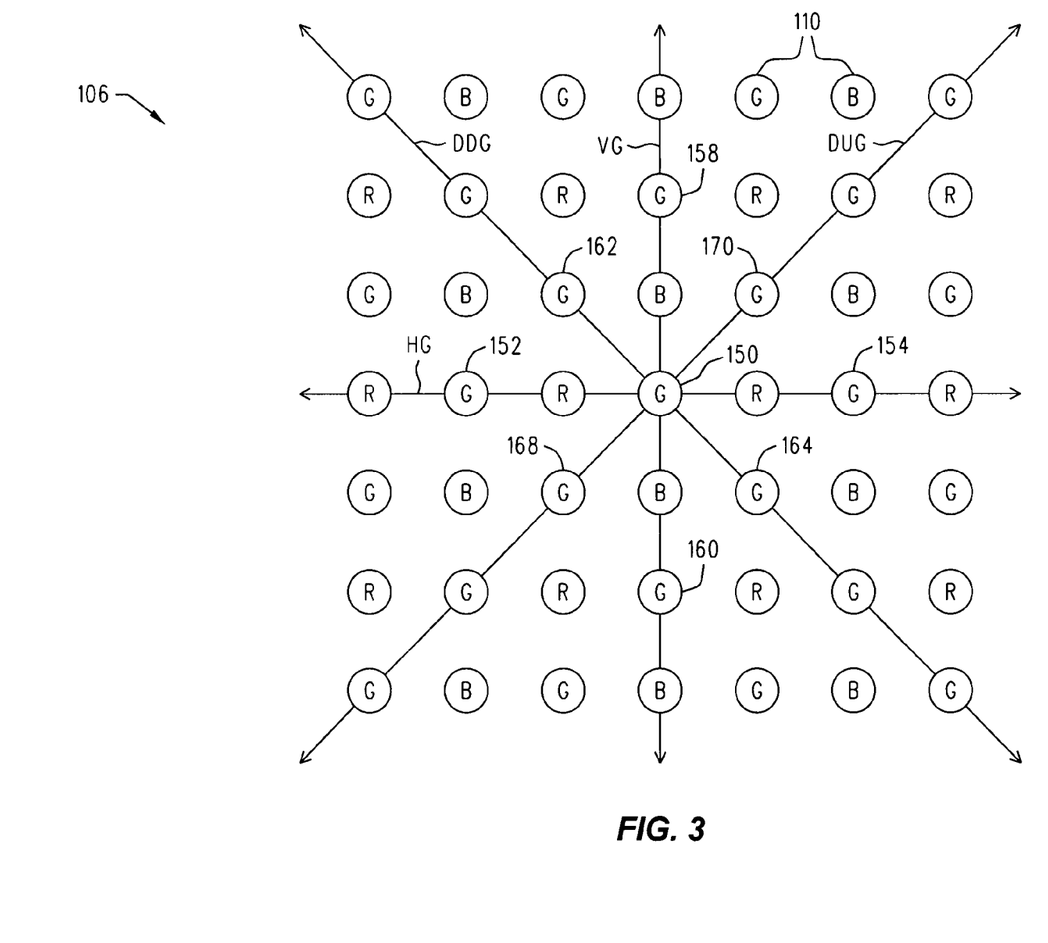
FIG. 3 is another partial front view of an embodiment of the two-dimensional photosensor array used in the digital camera of FIG. 1.

With reference to FIG. 3 and as described above, the photosensors 110 in the photosensor array 106 are arranged in the Bayer pattern. It is noted that other arrangements of the photosensors 110 may be used. FIG. 3 is a similar view of the photosensor array 106 and shows an embodiment for calculating a pixel value for a defective photosensor 150. The defective photosensor 150 generates image data representative of the intensity of green light it receives. It is noted that the Bayer pattern uses twice as many green photosensors as red and blue photosensors. Therefore, the pattern of green photosensors differs from the pattern of blue and red photosensors. Accordingly, the analysis to determine a pixel value for a defective green photosensor also differs somewhat.

The analysis and calculations for determining a pixel value for the defective green photosensor 150 are very similar to the analysis and calculations described above in reference to FIG. 2. The processor 112 establishes a plurality of axes that extend through the defective photosensor 150. In one embodiment described herein, the processor 112 establishes two axes that are referred to as the DDG axis and the DUG axis. It is noted that when two axes are used to calculate a pixel value of a defective green pixel, diagonal axes may be used. Because of the Bayer pattern, the closest green photosensors are along diagonal axes, not horizontal and vertical axes. Thus, pixel values of photosensors located on the diagonal axes may be used to calculate a pixel value of the defective photosensor 150.

As with the analysis related to FIG. 2, the absolute value of the differences in pixel values corresponding to two photosensors on each axes are analyzed, wherein the photosensors on each axis are located on opposite sides of the defective photosensor 150. In the example of FIG. 3, the difference of pixels values corresponding to photosensors 162 and 164 are calculated. The absolute value of this difference is referred to as the DDG axis difference. The difference of pixel values corresponding to photosensors 168 and 170 is also calculated. The absolute value of this difference is referred to as the DUG axis difference. The processor 112 determines which difference, the DUG axis difference or the DDG axis difference, is less. The pixel values corresponding to the least difference are used to determine a pixel value corresponding to the defective photosensor 150. In one embodiment, the average of the pixel values is used as the pixel value corresponding to the defective photosensor 150.

In some embodiments, more axes are used in the analysis. In one embodiment, pixel values corresponding to photosensors located on a horizontal axis HG and a vertical axis VG are used in the analysis and calculations. For example, the difference of pixel values corresponding to photosensors 152 and 154 is calculated. The absolute value of this difference is referred to as the HG axis difference. Likewise, the difference of pixel values corresponding to photosensors 158 and 160 is calculated. The absolute value of this difference is referred to as the VG axis difference. The pixel values corresponding to the least difference among the HG axis difference, the VG axis difference, the DDG axis difference, and the DUG axis difference are used to calculate a pixel value for the defective photosensor 150. As stated above, the average of the selected pixel values may be used as the pixel value for the defective photosensor 150.

The above-described differences may be weighted to compensate for the distances between the photosensors used in the calculations and the defective photosensor 150. It is noted that the green photosensor located on the horizontal axis HG and the vertical axis VG are further away from the defective photosensor 150 than the green photosensors located on the diagonal axes DDG and DUG. Therefore, the differences in pixel values corresponding to photosensors located on the horizontal axis HG and vertical axis VG may be weighted. As with the example related to the red and blue photosensors, the weighting may be achieved by multiplying the differences by twice the cosine of forty-five degrees, which is approximately 1.414.

The examples provided above have been shown with two and four axes. It is to be understood that any number of axis may be used. It is also to be understood that the axes need not be perpendicular or at angles of forty-five degrees relative to one another.

Other embodiments of the analysis and calculations will now be described wherein a plurality of axes are used to determine the direction from which the photosensors are selected in order to calculate pixel values for defective photosensors. In summary, the plurality of axes improves the probability that the direction chosen for selection of pixel values is the best direction by analyzing several axes in each direction. Due to the large number of axes used in the following embodiments, the axes will be shown in several figures.

Figure 4:
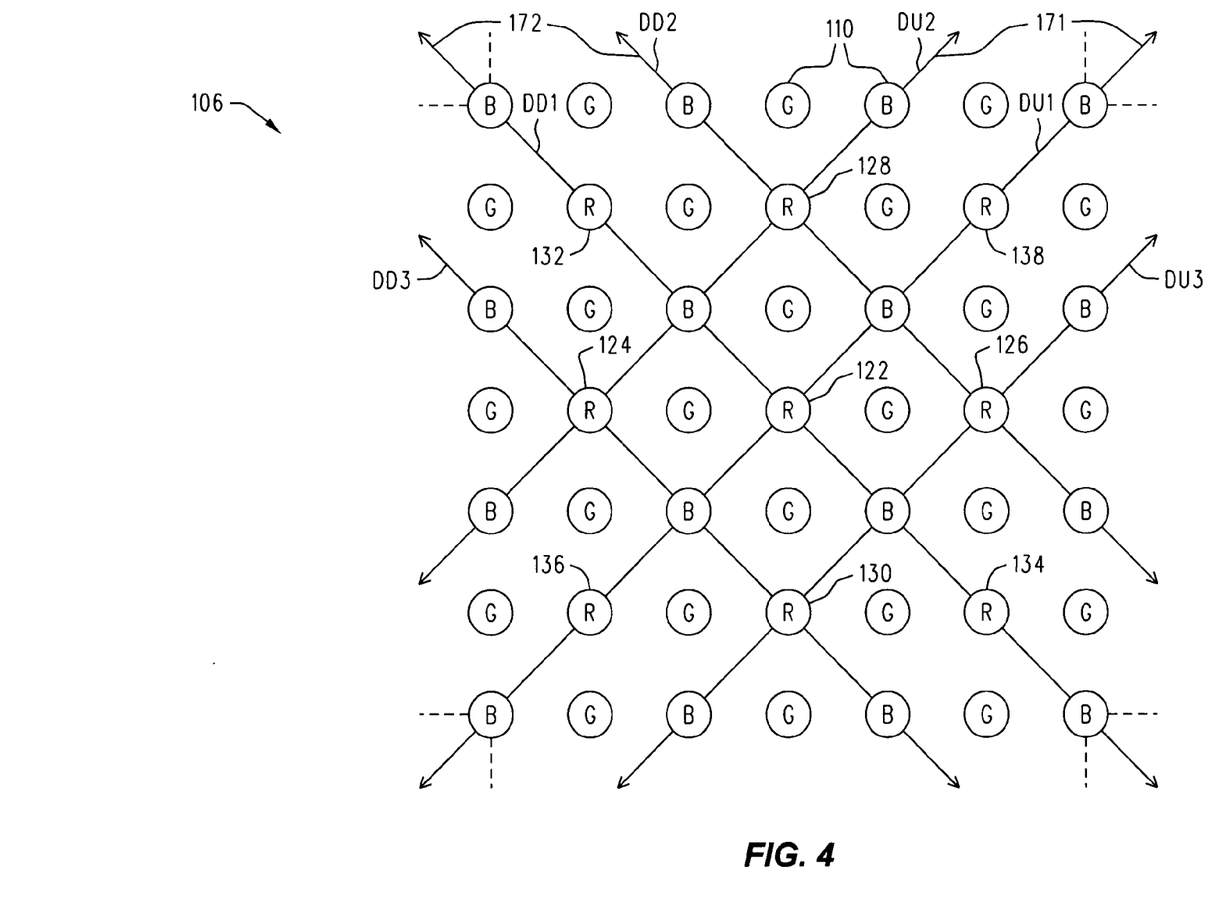
FIG. 4 is a the partial front view of the two-dimensional photosensor array of FIG. 2 wherein several axes are used to determine a pixel value.
Figure 5:
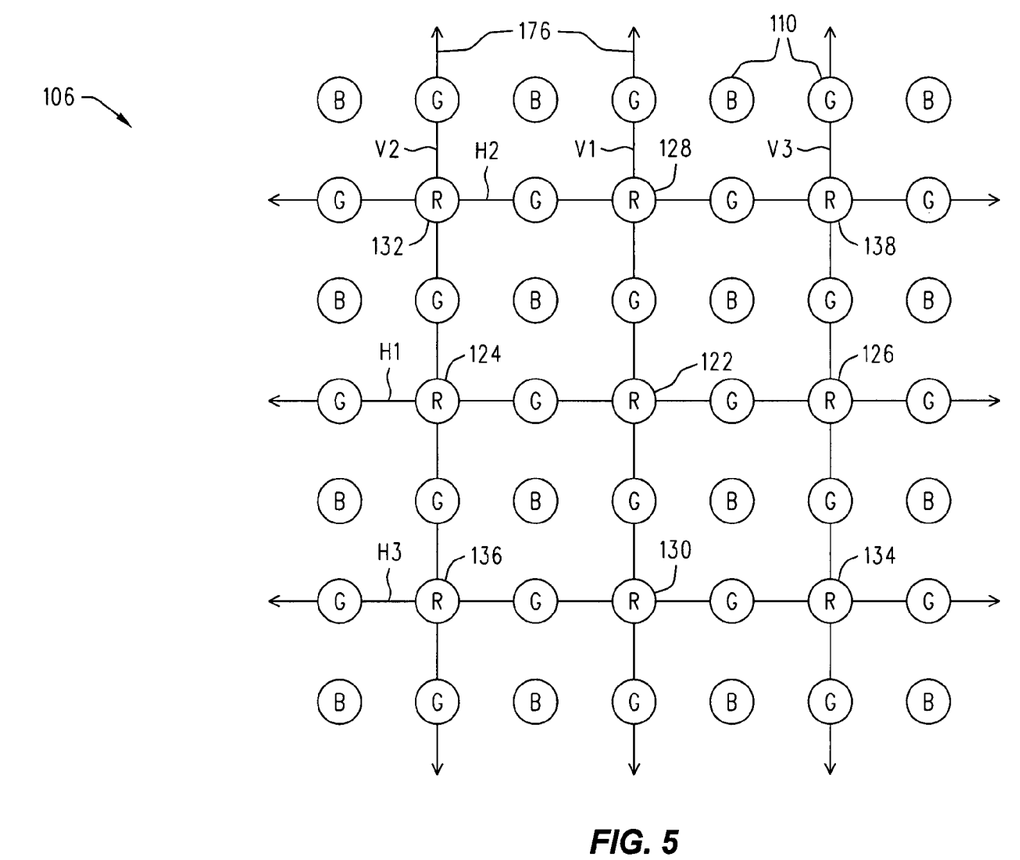
FIG. 5 is a view of the two-dimensional photosensor array of FIG. 4 showing different axes.

In one embodiment shown in FIGS. 4 and 5, several axes are used to determine a pixel value for the defective photosensor 122. In FIG. 4, a plurality of diagonal up axes 171 and a plurality of diagonal down axes 172 are used to determine a pixel value for the defective photosensor 122. The diagonal up axes 171 are referred to individually as axis DU1, axis DU2, and axis DU3, wherein the axis DU1 extends through the defective photosensor 122. The diagonal down axes 172 are referred to individually as axis DD1, axis DD2, and axis DD3 wherein the axis DD1 extends through the defective photosensor 122.

In order to determine whether pixel values corresponding to photosensors located on the axis DU1 are to be used, pixel values corresponding to photosensors located on the diagonal up axes 171 and proximate the defective photosensor 122 are analyzed. The color of the analyzed photosensors is the same as the color of the defective photosensor 122. The absolute value of the difference in pixel values corresponding to red photosensors on the diagonal up axes 171 are calculated. Thus, the absolute value of the difference between pixel values corresponding to photosensors 136 and 138 is calculated and is referred to as the DU1 difference. The absolute value of the difference between pixel values corresponding to photosensors 124 and 128 is calculated and is referred to as the DU2 difference. The absolute value of the difference between pixel values corresponding to photosensors 126 and 130 is calculated and is referred to as the DU3 difference.

A value, referred to herein as the DU value, is calculated for the DU direction based on the above described differences. It is noted that the values associated with axis directions are sometimes referred to herein as directional values. In one embodiment, the DU value is equal to the DU1 difference plus the average of the DU2 difference and the DU3 difference. In another embodiment, the DU1 difference is multiplied by a value in order to weight it. Weighting is used because the DU1 axis extends through the defective photosensor 122. Thus, differences in pixel values along the DU1 axis will be emphasized by the weighting. In one embodiment the DU1 difference is weighted by a value of three. Thus, the DU value is equal to three times the DU1 difference plus the average of the DU2 difference and the DU3 difference. The DU value will be used to determine whether the pixel values of the photosensors 136 and 138 will be used to calculate the pixel value of the defective photosensor 122.

As with the diagonal up axes 171, differences are calculated for the diagonal down axes 172. The absolute value of the difference between pixel values corresponding to photosensors 132 and 134 is calculated and is referred to as the DD1 difference. The absolute value of the difference between pixel values corresponding to photosensors 126 and 128 is calculated and is referred to as the DD2 difference. The absolute value of the difference between pixel values corresponding to photosensors 124 and 130 is calculated and is referred to as the DD3 difference.

A value, referred to herein as the DD value, is calculated in a similar manner as the DU value. The DD value is used to determine whether the pixel values corresponding to the photosensors 132 and 134 will be used to calculate the pixel value for the defective photosensor 122. In one embodiment, the DD value is equal to the DD1 difference plus the average of the DD2 difference and the DD3 difference. In another embodiment, the DD1 difference is multiplied by a value in order to weight it as described above. In one embodiment the DD1 difference is weighted by a value of three. Thus, the DD value is equal to three times the DD1 difference plus the average of the DD2 difference and the DD3 difference.

The pixel values used to calculate the pixel value corresponding to the defective photosensor 122 may be selected based on the DU value and the DD value. More specifically, the lesser of either the DU value or the DD value is chosen. The pixel values corresponding to the photosensors on either the DD1 or DU1 axis are selected to calculate the pixel value corresponding to the defective photosensors 122 as described above. For example if the DU value is less than the DD value, pixel values corresponding to photosensors 136 and 138 are used to calculate the pixel value of the defective photosensor 122. Likewise if the DD value is less than the DU value, pixel values corresponding to photosensors 132 and 134 are used to calculate the pixel value of the defective photosensor 122.

Multiple axes may also be used to determine whether the pixel values associated with photosensors located on the horizontal and vertical axes may be used to calculate the pixel value of the defective photosensor 122. An example of using multiple axes in the horizontal and vertical directions is shown in FIG. 5. The multiple horizontal axes 174 are referred to individually as axis H1, axis H2, and axis H3, wherein the axis H1 extends through the defective photosensor 122. The multiple vertical axes 176 are referred to individually as axis V1, axis V2, and axis V3, wherein the axis V1 extends through the defective photosensor 122.

As with the previously described embodiments, a value H is calculated, which is used to determine whether pixel values corresponding to photosensors located on the H1 axis are used to calculate the pixel value corresponding to the defective photosensor 122. Several differences are calculated in order to determine the value H. A difference H1 is the absolute value of the difference in pixel values between photosensor 124 and photosensor 126. These photosensors correspond to red photosensors located on the H1 axis that are proximate the defective photosensor 122 and located on opposite sides of the defective photosensors 122. A difference H2 is the average of pixel values corresponding to the absolute value of the difference of photosensor 132 and photosensor 128 plus the absolute value of the difference of photosensor 128 and photosensor 138. The H2 difference may be expressed as follows:

$$H2\ \text{difference} = ave/[|132-128|+|128-138|]$$

Thus, the H2 difference is related to the average of differences in red photosensors located on the H2 axis and proximate the defective photosensor 122. A difference H3 is the average of pixel values corresponding to the absolute value of the difference of photosensor 136 and photosensor 130 plus the absolute value of the difference of photosensor 130 and photosensor 134. The H3 difference may be expressed as follows:

$$H3\ \text{difference} = ave/[|136-130|+|130-134|]$$

Thus, the H3 difference is related to the average of differences in red photosensors located on the H3 axis and proximate the defective photosensor 122.

The value H may be calculated based on the above-described differences. In one embodiment, the value H is calculated as the sum of the differences H1, H2, and H3. In another embodiment, the difference H1 is weighted to emphasis the location of the H1 axis extending through the defective photosensor 122. In one embodiment, the difference H1 is weighted by multiplying it by three. Thus, the value H is equal to the sum of: three times the difference H1, the difference H2, and the difference H3.

Similar calculations are used in the vertical direction to calculate a value V. A difference V1 is the absolute value of the difference in pixel values corresponding to photosensor 128 and photosensor 130. These photosensors correspond to red photosensors located on the V1 axis that are proximate the defective photosensor 122. A difference V2 is the average of pixel values corresponding to the absolute value of the difference of photosensor 132 and photosensor 124 plus the absolute value of the difference of photosensor 124 and photosensor 136. The V2 difference may be expressed as follows:

$$V2\text{ difference}=ave[|132-124|+|124-136|]$$

Thus, the V2 difference is related to the average of differences in red photosensors located on the V2 axis and proximate the defective photosensor 122. A difference V3 is the average of pixel values corresponding to the absolute value of the difference of photosensor 138 and photosensor 126 plus the absolute value of the difference of photosensor 126 and photosensor 134. The V3 difference may be expressed as follows:

$$V3\text{ difference}=ave[|138-126|+|126-134|]$$

Thus, the V3 difference is related to the average of differences in red photosensors located on the V3 axis and proximate the defective photosensor 122.

The value V may be calculated based on the above-described differences. In one embodiment, the value V is calculated as the sum of the differences V1, V2, and V3. In another embodiment, the difference V1 is weighted to emphasis the location of the V1 axis extending through the defective photosensor 122. In one embodiment, the difference V1 is weighted by multiplying it by three. Thus, the value V is equal to the sum of: three times the difference V1, the difference V2, and the difference V3.

The H, V, DD, and DU values may be compared to identify the minium. The pixel values corresponding the photosensors of the minium value are used to calculate the pixel value corresponding to the defective photosensor 122. For example, if the value DU is the minimum, pixel values corresponding to photosensors 138 and 136 are used to calculate the pixel value corresponding to the defective photosensor 122. In one embodiment, the pixel value of the defective photosensor 122 is the average of the pixel values corresponding to the photosensors 138 and 136.

As set forth above, the red and blue photosensors have the same pattern in the Bayer pattern. Therefore, the above described analysis and calculations may be used to determine pixel values of defective blue photosensors.

Figure 6:
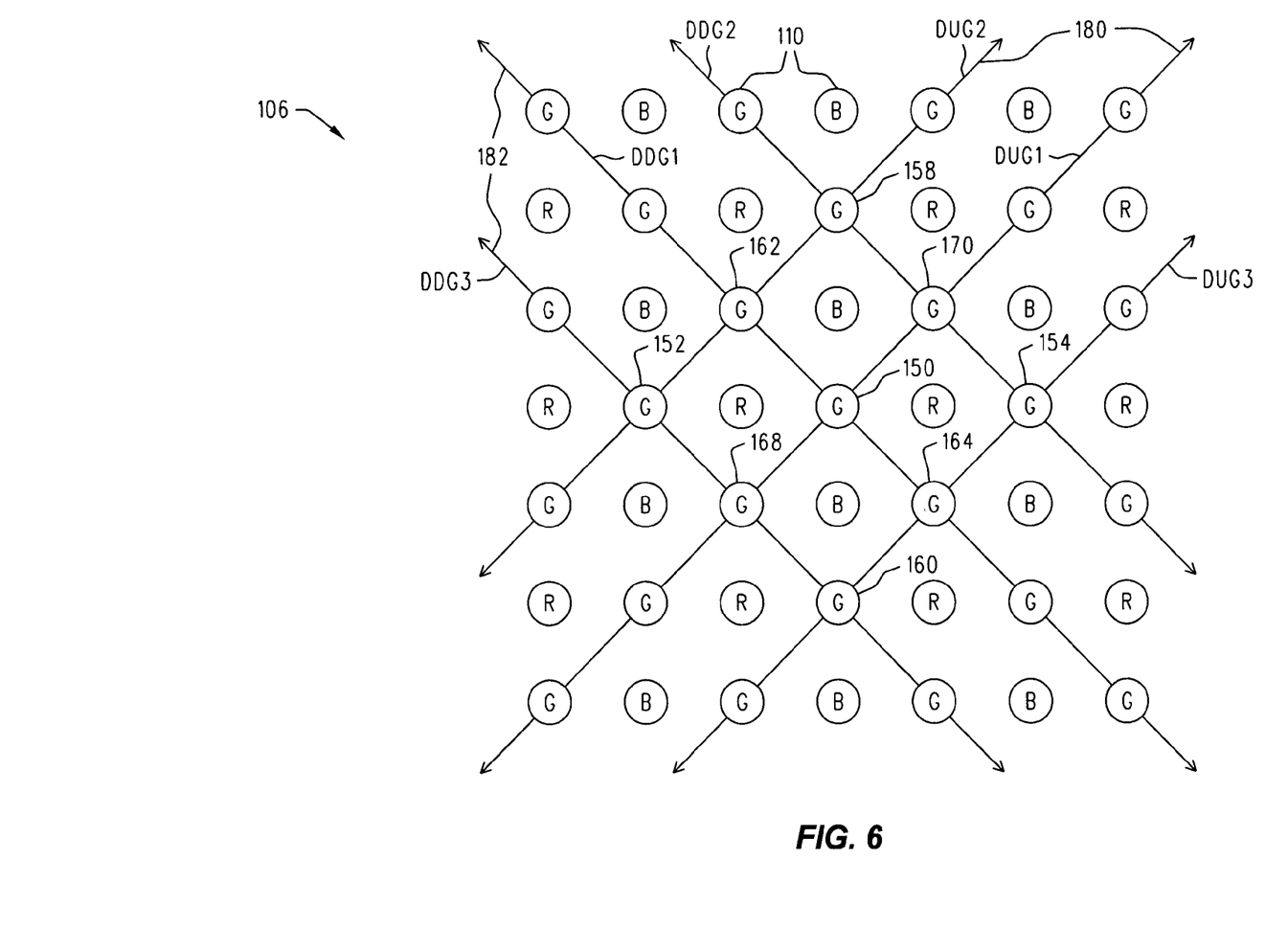
FIG. 6 is the partial front view of the two-dimensional photosensor array of FIG. 3 wherein several axes are used to determine a pixel value.

Having described embodiments for selection of pixel values for defective blue and red photosensors, embodiments for selection of pixel values for defective green photosensors will now be described. An embodiment of selection of a pixel value for the defective green photosensor 150 is shown in FIG. 6. More specifically, the embodiment shown in FIG. 6 is based on using a plurality of diagonal axes to determine which pixel values are used to calculate the pixel value of a defective photosensor.

FIG. 6 shows a plurality of diagonal up axes 180 that are referred to individually as axis DUG1, axis DUG2, and axis DUG3, wherein axis DUG1 extends through the defective photosensor 150. A plurality of diagonal down axes 182 extend substantially perpendicular to the diagonal up axes 180. The diagonal down axis 182 are referred to individually herein as axis DDG1, axis DDG2, and axis DDG3, wherein axis DDG1 extends through the defective photosensor 150.

Calculations similar to those described in reference to FIG. 5 are performed on the pixel values associated with the diagonal axis of FIG. 6. A DUG1 difference is calculated as the absolute value of the difference between pixel values corresponding to the photosensor 168 and the photosensor 170. A DUG2 difference is calculated as the average of the absolute value of the difference in pixel values corresponding to the photosensor 152 and 162 and the absolute value of the difference in pixel values corresponding to the photosensors 162 and 158. The DUG2 difference may be expressed as follows:

$$DUG2\text{ difference}=ave[|152-162|+|162-158|]$$

A DUG3 difference is calculated as the average of the absolute value of the difference in pixel values corresponding to the photosensor 154 and 164 and the absolute value of the difference in pixel values corresponding to the photosensors 164 and 160. The DUG3 difference may be expressed as follows:

$$DUG3\text{ difference}=ave[|154-164|+|164-160|]$$

In summary, the differences associated with the axes that are parallel to the axis DUG1 is the average of the pixel values proximate the defective photosensor 150.

Similar differences are calculated with reference to the diagonal down axes 182. A DDG1 difference is calculated as the absolute value of the difference between pixel values corresponding to the photosensor 162 and the photosensor 164. DDG2 difference is calculated as the average of the absolute value of the difference in pixel values corresponding to the photosensor 158 and 170 and the absolute value of the difference in pixel values corresponding to the photosensors 170 and 154. The DDG2 difference may be expressed as follows:

$$DDG2\text{ difference}=ave[|158-170|+|170-154|]$$

A DDG3 difference is calculated as the average of the absolute value of the difference in pixel values corresponding to the photosensor 152 and 168 and the absolute value of the difference in pixel values corresponding to the photosensors 168 and 160. The DDG3 difference may be expressed as follows:

$$DDG3\text{ difference}=ave[|152-168|+|168-160|]$$

Based on the above-described differences, DDG and DUG values may be calculated. The DDG value may be equal to the sum of: the DDG1 difference, the DDG2 difference, and the DDG3 difference. As with other differences, the DDG1 difference may be weighted. In one embodiment, the DDG value using a weighted DDG1 difference is equal to the sum of: three times the DDG1 difference, the DDG2 difference, and the DDG3 difference. The DUG value may be equal to the sum of: the DUG1 difference, the DUG2 difference, and the DUG3 difference. As with other differences, the DUG1 difference may be weighted. In one embodiment, the DUG value using a weighted DUG1 difference is equal to the sum of: three times the DUG1 difference, the DUG2 difference, and the DUG3 difference.

Selection of pixel values used to calculate the pixel value of the defective photosensor 150 may be based on the DDG and DUG values. The pixel values are based on the axis corresponding to the lesser of either the DDG value or the DUG value. For example, if the DDG value is less than the DUG value, pixel values of photosensors 162 and 164 are used to calculate the pixel value of the defective photosensor 150.

Multiple axes that are substantially vertical and horizontal may also be analyzed to determine a pixel value for the defective photosensors 150. An example of such an analysis is provided in FIG. 7 where three horizontal axes 186 and three vertical axes 188 are shown. The three horizontal axes 186 are referred to individually as axis HG1, axis HG2, and axis HG3, wherein the axis HG1 extends through the defective photosensor 150. The three vertical axes 188 are referred to individually as axis VG1, axis VG2, and axis VG3, wherein axis VG1 extends through the defective photosensor 150.

Figure 7:
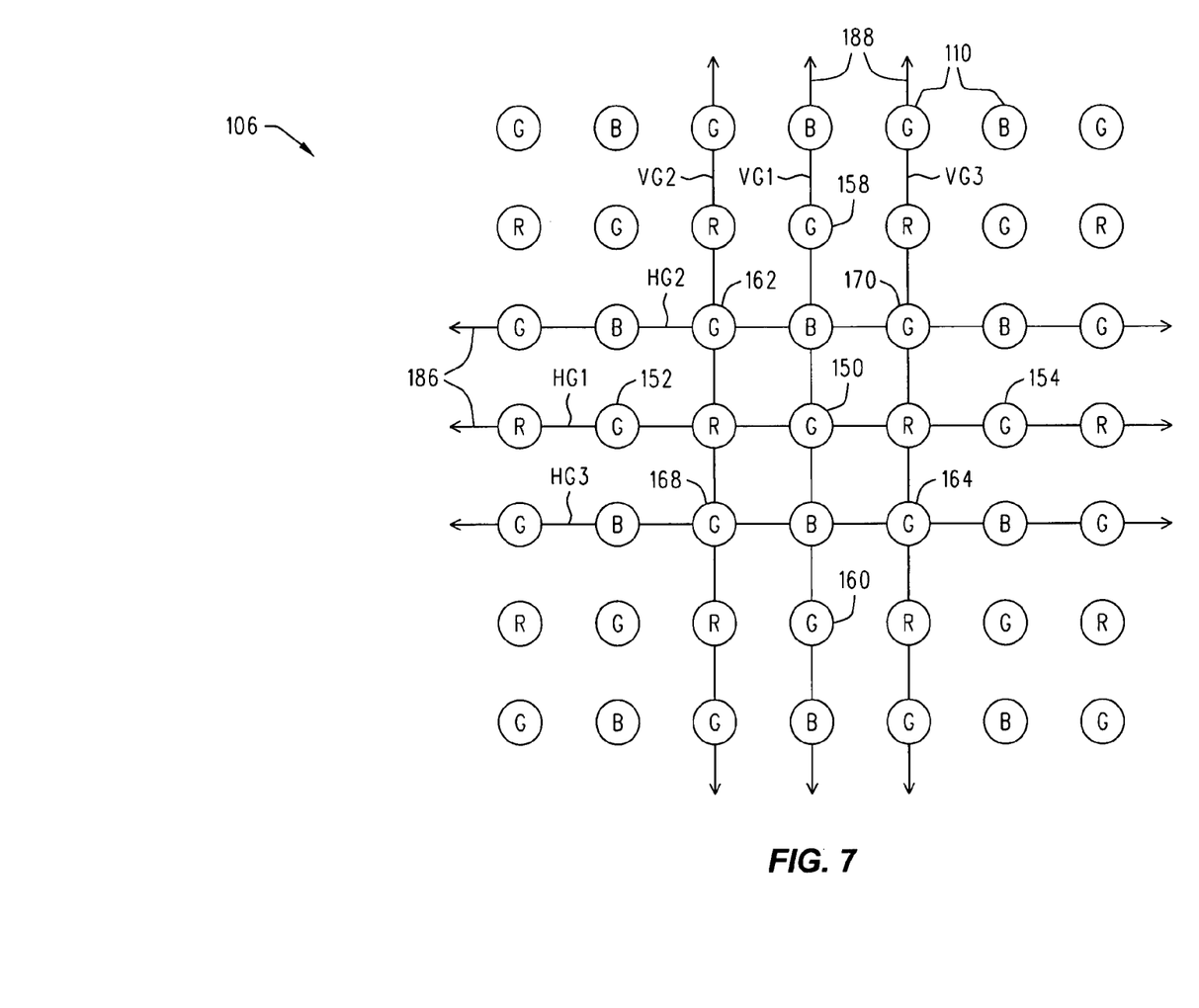
FIG. 7 is a view of the two-dimensional photosensor array of FIG. 6 showing different axes.

As with the other multiple axes embodiments described above, values associated with the horizontal axes 186 and the vertical axes 188 are calculated. The value associated with the horizontal axes 186 is referred to herein as the HG value. In summary, the differences in pixel values associated with photosensors located along the horizontal axes 186 are calculated to yield the HG value. As with the previous embodiments, the difference associated with photosensors located on the HG1 axis and on either side of the defective photosensor 150 may be weighted. In one embodiment, an HG1 difference is equal to the absolute value of the difference in pixel values corresponding to photosensors 152 and 154. An HG2 difference is equal to the absolute value of the difference in pixel values corresponding to photosensors 162 and 170. An HG3 difference is equal to the absolute value of the difference in pixel values corresponding to photosensors 164 and 168. In one embodiment, the HG value is equal to the sum of the HG2 difference, the HG3 difference, and the HG1 difference. As stated in other embodiments, the difference corresponding to the axis that extends through the defective photosensor 150 may be weighted. In one embodiment it is weighted by a factor of three. Thus, the HG difference is equal to the sum of: three times the HG1 difference, the HG2 difference, and the HG3 difference.

Similar calculations may be performed in order to calculate the VG value. In one embodiment, a VG1 difference is equal to the absolute value of the difference in pixel values corresponding to photosensors 158 and 160. A VG2 difference is equal to the absolute value of the difference in pixel values corresponding to photosensors 162 and 168. A VG3 difference is equal to the absolute value of the difference in pixel values corresponding to photosensors 164 and 170. In one embodiment, the VG value is equal to the sum of the VG2 difference, the VG3 difference, and the VG1 difference. As stated in other embodiments, the difference corresponding to the axis that extends through the defective photosensor 150 may be weighted. In one embodiment it is weighted by a factor of three. Thus, the VG value is equal to the sum of: three times the VG1 difference, the VG2 difference, and the VG3 difference.

Having completed the calculations for the horizontal and vertical values, the HG and VG values may be used to selected the photosensors that will be used to calculate the pixel value for the defective photosensor 150. The pixel values corresponding to the photosensors located on the axis extending through the defective photosensors 150 and associated with the least value are used to calculate the pixel value of the defective photosensor 150. For example, if the HG value is the least, the pixel values of the photosensors 152 and 154 may be used to calculate the pixel value for the defective photosensor 150. In one embodiment, the pixel value of the defective photosensor 150 is the average of pixel values corresponding to the photosensors 152 and 154.

In some embodiments all the values are compared. For example, the DUG, DDG, HG, and VG values may be compared to determine which one is the least. Pixel values associated with the lesser value are used to calculate the pixel value of the defective photosensor. In other embodiments fewer than all the above-described axes may be compared. In yet other embodiments, more axes may be analyzed to calculate more differences.

Devices and methods for analyzing images, or otherwise reducing the effects of defective pixels, have been described herein. The devices and methods described herein analyze image data that is representative of images. The devices and methods for analyzing images may be implemented in hardware, software, firmware, or a combination thereof. In some embodiments, the system and method for analyzing images are implemented using a combination of hardware, software or firmware that is stored in a memory and that is executable by a suitable instruction execution system. In the embodiments described herein, the device is a digital camera wherein software stored on hardware in the camera analyzes image data.

The hardware portion of the system and method for analyzing a captured image can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The software portion of the system and method for analyzing a captured image can be stored in one or more memory elements and executed by a suitable general purpose or application specific processor.

The software for analyzing images, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means, which contain, store, communicate, propagate, or transport the program for use by or in connection with the instruction execution system, apparatus, or device.

What is claimed is:

1. A method of improving image quality, said method comprising:

generating image data representative of a scene using a two-dimensional photosensor array, said image data comprising a plurality of pixel values, wherein each photosensor in said photosensor array generates a pixel value;

identifying a defective photosensor;

determining a first pixel value and a second pixel value, said first pixel value corresponding to a first photosensor and said second pixel value corresponding to a second photosensor, said first photosensor and said second photosensor being located on a first axis, said defective photosensor being located on said first axis between said first photosensor and said second photosensor;

determining a third pixel value and a fourth pixel value, said third pixel value corresponding to a third photosensor and said fourth pixel value corresponding to a fourth photosensor, said third photosensor and said fourth photosensor being located on a second axis, said defective photosensor being located on said second axis between said third photosensor and said fourth photosensor;

calculating a first absolute value of the difference between said first pixel value and said second pixel value;

calculating a second absolute value of the difference between said third pixel value and said fourth pixel value;

wherein the value of a pixel value corresponding to said defective photosensor is the average of the pixel values corresponding to the lesser of either said first absolute value or said second absolute value.

2. The method of claim 1, wherein said first axis is substantially perpendicular to said second axis.

3. The method of claim 1, wherein said first photosensor and said second photosensor are located further away from said defective photosensor than said third photosensor and said fourth photosensor; and further comprising multiplying said first absolute value by a preselected value.

4. The method of claim 3, wherein said preselected value is approximately 1.4.

5. The method of claim 1, wherein said defective photosensor, said first photosensor, said second photosensor, said third photosensor, and said fourth photosensor all generate image data representative of the same color of light.

6. The method of claim 1, wherein said defective photosensor, said first photosensor, and said second photosensor all generate image data representative of a color of light, wherein no other photosensors that generate image data representative of said color of light are located on said first axis between either said first photosensor and said defective photosensor or between said second photosensor and said defective photosensor.

7. The method of claim 1, wherein said defective photosensor, said third photosensor, and said fourth photosensor all generate image data representative of a color of light, wherein no other photosensors that generate image data representative of said color of light are located on said second axis between either said third photosensor and said defective photosensor or between said fourth photosensor and said defective photosensor.

8. The method of claim 1 and further comprising:
determining a fifth pixel value and a sixth pixel value, said fifth pixel value corresponding to a fifth photosensor and said sixth pixel value corresponding to a sixth photosensor, said fifth photosensor and said sixth photosensor being located on a third axis, said defective photosensor being located on said third axis between said fifth photosensor and said sixth photosensor;
determining a seventh pixel value and an eighth pixel value, said seventh pixel value corresponding to a seventh photosensor and said eighth pixel value corresponding to an eighth photosensor, said seventh photosensor and said eighth photosensor being located on a fourth axis, said defective photosensor being located on said fourth axis between said seventh photosensor and said eighth photosensor;
calculating a third absolute value of the difference between said fifth pixel value and said sixth pixel value;
calculating a fourth absolute value of the difference between said seventh pixel value and said eighth pixel value;
wherein the value of a pixel value corresponding to said defective photosensor is the average of the pixel values corresponding to the lesser of said first absolute value, said second absolute value, said third absolute value, or said fourth absolute value.

9. The method of claim 8, wherein said third axis is substantially perpendicular to said fourth axis.

10. The method of claim 8, wherein said fifth photosensor and said sixth photosensor are located further away from said defective photosensor than said seventh photosensor and said eighth photosensor; and further comprising multiplying said third absolute value by a preselected value.

11. The method of claim 10, wherein said preselected value is approximately 1.4.

12. The method of claim 1, wherein said identifying a defective photosensor comprises:
isolating said array of photosensors from light;
causing said photosensor array to generate image data;
transforming said image data to pixel values, wherein each pixel value corresponds to image data generated by individual photosensors;
calculating the average pixel value corresponding to at least two photosensors; and
identifying defective photosensors as photosensors corresponding to pixel values that are greater than said average by a first preselected value or that are less than said average by a second preselected value.

13. A method of improving image quality, said method comprising:
generating image data representative of a scene using a two-dimensional photosensor array, said image data comprising a plurality of pixel values, wherein each photosensor in said photosensor array generates a pixel value;
identifying a defective photosensor, said defective photosensor being associated with a color;
establishing a first axis extending through said defective photosensor;
establishing a second axis and a third axis, said second axis and said third axis being substantially parallel to said first axis and located on opposite sides of said first axis;
establishing a fourth axis extending through said defective photosensor;
establishing a fifth axis and a sixth axis, said fifth axis and said sixth axis being substantially parallel to said fourth axis and located on opposite sides of said fourth axis;
calculating a first difference, said first difference being equal to the absolute value of the difference of pixel values corresponding to photosensors located on said first axis and on opposite sides of said defective photosensor;
calculating a second difference, said second difference being equal to at least one difference between pixel values corresponding to photosensors located on said second axis;
calculating a third difference, said third difference being equal to at least one difference between pixel values corresponding to photosensors located on said third axis;
calculating a fourth difference, said fourth difference being equal to the absolute value of the difference of pixel values corresponding to photosensors located on said fourth axis and on opposite sides of said defective photosensor;
calculating a fifth difference, said fifth difference being equal to at least one difference between pixel values corresponding to photosensors located on said fifth axis;
calculating a sixth difference, said sixth difference said third difference being equal to at least one difference between pixel values corresponding to photosensors located on said sixth axis;
calculating a first directional value based on said first difference, said second difference, and said third difference;
calculating a second directional value based on said fourth difference, said fifth difference, and said sixth difference;
comparing said first directional value to said second directional value; and
calculating a pixel value for said defective photosensor based on said comparing.

14. The method of claim 13, wherein said first axis is substantially perpendicular to said fourth axis.

15. The method of claim 13, wherein said first directional value is equal to the sum of said first difference, said second difference, and said third difference and wherein said second directional value is equal to the sum of said fourth difference, said fifth difference, and said sixth difference.

16. The method of claim 13, wherein said first directional value is equal to the sum of: a preselected value multiplied by said first difference, said second difference, and said third difference and wherein said second directional value is equal to the sum of: said preselected value multiplied by said fourth difference, said fifth difference, and said sixth difference.

17. The method of claim 16, wherein said preselected value is approximately three.

18. The method of claim 13, wherein:
said second difference is equal to the average of the sum of the absolute value of the difference of a first pixel value and a second pixel value corresponding to first and second photosensors located on said second axis and the absolute value of the difference of said second pixel value and a third pixel value corresponding to a third photosensor located on said second axis;
said third difference is equal to the average of the sum of the absolute value of the difference of a first pixel value and a second pixel value corresponding to first and second photosensors located on said third axis and the absolute value of the difference of said second pixel value and a third pixel value corresponding to a third photosensor located on said third axis;
said fifth difference is equal to the average of the sum of the absolute value of the difference of a first pixel value and a second pixel value corresponding to first and second photosensors located on said fifth axis and the absolute value of the difference of said second pixel value and a third pixel value corresponding to a third photosensor located on said fifth axis; and
said sixth difference is equal to the average of the sum of the absolute value of the difference of a first pixel value and a second pixel value corresponding to first and second photosensors located on said sixth axis and the absolute value of the difference of said second pixel value and a third pixel value corresponding to a third photosensor located on said sixth axis.

19. The method of claim 13, wherein:
said second difference is equal to the absolute value of the difference of pixel values corresponding to photosensors located on said second axis and wherein said photosensors are substantially equal distance from said defective photosensor;
said third difference is equal to the absolute value of the difference of pixel values corresponding to photosensors located on said third axis and wherein said photosensors are substantially equal distance from said defective photosensor;
said fifth difference is equal to the absolute value of the difference of pixel values corresponding to photosensors located on said fifth axis and wherein said photosensors are substantially equal distance from said defective photosensor; and
said sixth difference is equal to the absolute value of the difference of pixel values corresponding to photosensors located on said sixth axis and wherein said photosensors are substantially equal distance from said defective photosensor.

20. The method of claim 13, wherein said comparing said first directional value to said second directional value comprises determining the lesser value of said first directional value and said second directional value.

21. The method of claim 13, wherein said calculating a pixel value comprises selecting pixel values for said calculating corresponding to photosensors located on said first axis if said first directional value is less than said second directional value and selecting pixel values for said calculating corresponding to photosensors located on said fourth axis if said second directional value is less than said first directional value.

22. The method of claim 21, wherein said calculating a pixel value comprises calculating the average of said selected pixel values.

23. A method of improving image quality, said method comprising:
generating image data representative of a scene using a two-dimensional photosensor array, said image data comprising a plurality of pixel values, wherein each photosensor in said photosensor array generates a pixel value;
identifying a defective photosensor, said defective photosensor being associated with a color;
establishing a first axis extending through said defective photosensor;
establishing a second axis and a third axis, said second axis and said third axis being substantially parallel to said first axis and located on opposite sides of said first axis;
establishing a fourth axis extending through said defective photosensor;
establishing a fifth axis and a sixth axis, said fifth axis and said sixth axis being substantially parallel to said fourth axis and located on opposite sides of said fourth axis;
establishing a seventh axis extending through said defective photosensor;
establishing an eighth axis and a ninth, said eighth axis and said ninth axis being substantially parallel to said seventh axis and located on opposite sides of said seventh axis;
establishing a tenth axis extending through said defective photosensor;
establishing an eleventh axis and a twelfth axis, said eleventh axis and said twelfth axis being substantially parallel to said tenth axis and located on opposite sides of said tenth axis;
calculating a first difference, said first difference being equal to the absolute value of the difference of pixel values corresponding to photosensors located on said first axis and on opposite sides of said defective photosensor;
calculating a second difference, said second difference being equal to at least one difference between pixel values corresponding to photosensors located on said second axis;
calculating a third difference, said third difference being equal to at least one difference between pixel values corresponding to photosensors located on said third axis;
calculating a fourth difference, said fourth difference being equal to the absolute value of the difference of pixel values corresponding to photosensors located on said fourth axis and on opposite sides of said defective photosensor;
calculating a fifth difference, said fifth difference being equal to at least one difference between pixel values corresponding to photosensors located on said fifth axis;
calculating a sixth difference, said sixth difference being equal to at least one difference between pixel values corresponding to photosensors located on said sixth axis;
calculating a seventh difference, said seventh difference being equal to the absolute value of the difference of pixel values corresponding to photosensors located on said first axis and on opposite sides of said defective photosensor;

calculating an eighth difference, said eighth difference being equal to at least one difference of pixel values corresponding to photosensors located on said eighth axis;

calculating a ninth difference, said ninth difference being equal to at least one difference of pixel values corresponding to photosensors located on said ninth axis;

calculating a tenth difference, said tenth difference being equal to the absolute value of the difference of pixel values corresponding to photosensors located on said tenth axis and on opposite sides of said defective photosensor;

calculating a eleventh difference, said eleventh difference being equal at least one difference of pixel values corresponding to photosensors located on said eleventh axis;

calculating a twelfth difference, said twelfth difference being equal to at least one difference of pixel values corresponding to photosensors located on said twelfth axis;

calculating a first directional value based on said first difference, said second difference, and said third difference;

calculating a second directional value based on said fourth difference, said fifth difference, and said sixth difference;

calculating a third directional value based on said seventh difference, said eighth difference, and said ninth difference;

calculating a fourth directional value based on said tenth difference, said eleventh difference, and said sixth difference;

comparing said first directional value, said second directional value, said third directional value, and said fourth directional value; and calculating a pixel value for said defective photosensor based on said comparing.

24. The method of claim 23, wherein:

said second difference is equal to the average of the sum of the absolute value of the difference of a first pixel value and a second pixel value corresponding to first and second photosensors located on said second axis and the absolute value of the difference of said second pixel value and a third pixel value corresponding to a third photosensor located on said second axis;

said third difference is equal to the average of the sum of the absolute value of the difference of a first pixel value and a second pixel value corresponding to first and second photosensors located on said third axis and the absolute value of the difference of said second pixel value and a third pixel value corresponding to a third photosensor located on said third axis;

said fifth difference is equal to the average of the sum of the absolute value of the difference of a first pixel value and a second pixel value corresponding to first and second photosensors located on said fifth axis and the absolute value of the difference of said second pixel value and a third pixel value corresponding to a third photosensor located on said fifth axis; and said sixth difference is equal to the average of the sum of the absolute value of the difference of a first pixel value and a second pixel value corresponding to first and second photosensors located on said sixth axis and the absolute value of the difference of said second pixel value and a third pixel value corresponding to a third photosensor located on said sixth axis.

25. The method of claim 24, wherein:

said first and third photosensors located on said second axis are substantially equal distance from said defective photosensor and said second photosensor located on said second axis is located between said first and third photosensors;

said first and third photosensors located on said third axis are substantially equal distance from said defective photosensor and said second photosensor located on said third axis is located between said first and third photosensors;

said first and third photosensors located on said fifth axis are substantially equal distance from said defective photosensor and said second photosensor located on said fifth axis is located between said first and third photosensors.

said first and third photosensors located on said sixth axis are substantially equal distance from said defective photosensor and said second photosensor located on said sixth axis is located between said first and third photosensors.

26. The method of claim 23, wherein:

said eighth difference is equal to the absolute value of the difference of pixel values corresponding to photosensors located on said eighth axis and wherein said photosensors are substantially equal distance from said defective photosensor;

said ninth difference is equal to the absolute value of the difference of pixel values corresponding to photosensors located on said ninth axis and wherein said photosensors are substantially equal distance from said defective photosensor;

said eleventh difference is equal to the absolute value of the difference of pixel values corresponding to photosensors located on said eleventh axis and wherein said photosensors are substantially equal distance from said defective photosensor; and said twelfth difference is equal to the absolute value of the difference of pixel values corresponding to photosensors located on said twelfth axis and wherein said photosensors are substantially equal distance from said defective photosensor.

27. The method of claim 23, wherein said first axis is substantially perpendicular to said fourth axis and wherein said seventh axis is substantially perpendicular to said tenth axis.

28. The method of claim 23, wherein:

said first directional value is equal to the sum of said first difference, said second difference, and said third difference;

said second directional value is equal to the sum of said fourth difference, said fifth difference, and said sixth difference;

said third directional value is equal to the sum of said seventh difference, said eighth difference, and said ninth difference; and said fourth directional value is equal to the sum of said tenth difference, said eleventh difference, and said twelfth difference.

29. The method of claim 23, wherein:

said first directional value is equal to the sum of: a preselected value multiplied by said first difference, said second difference, and said third difference.

said second directional value is equal to the sum of: a preselected value multiplied by said fourth difference, said fifth difference, and said sixth difference;

said third directional value is equal to the sum of: a preselected value multiplied by said seventh difference, said eighth difference, and said ninth difference;

said fourth directional value is equal to the sum of: a preselected value multiplied by said tenth difference, said eleventh difference, and said twelfth difference.

30. The method of claim 23, wherein said comparing said first directional value, said second directional value, said third directional value, and said fourth directional value comprises determining the lesser value of said first directional value, said second directional value, said third directional value, and said fourth directional value.

31. The method of claim 23, wherein said calculating a pixel value comprises selecting pixel values for said calculating corresponding to photosensors located on said the axis corresponding to the less of said first directional value, said second directional value, said third directional value, and said fourth directional value.

32. The method of claim 23, wherein said calculating a pixel value comprises calculating the average of said selected pixel values.

* * * * *

UNITED STATES PATENT AND TRADEMARK OFFICE
CERTIFICATE OF CORRECTION

PATENT NO. : 7,450,167 B2  Page 1 of 1
APPLICATION NO. : 11/055955
DATED : November 11, 2008
INVENTOR(S) : Yu-wei Wang et al.

It is certified that error appears in the above-identified patent and that said Letters Patent is hereby corrected as shown below:

In column 14, line 47, in Claim 13, after "said sixth difference" insert -- and --.

In column 18, lines 15-16, in Claim 25, delete "photosensors." and insert -- photosensors; --, therefor.

In column 18, line 64, in Claim 29, delete "difference." and insert -- difference; --, therefor.

Signed and Sealed this

Fifth Day of May, 2009

JOHN DOLL
*Acting Director of the United States Patent and Trademark Office*